United States Patent
Tung (10) Patent No.: US 8,640,726 B2
(45) Date of Patent: Feb. 4, 2014

(54) COLD AND HOT WATER BALANCING VALVE STRUCTURE

(75) Inventor: Ping-Jung Tung, Taichung (TW)

(73) Assignees: Ping-Jung Tung, Taichung (TW); Paijo Co., Ltd., Changhua, Changhua County (TW)

( * ) Notice: Subject to any disclaimer, the term of this patent is extended or adjusted under 35 U.S.C. 154(b) by 129 days.

(21) Appl. No.: 13/279,931

(22) Filed: Oct. 24, 2011

(65) Prior Publication Data

US 2013/0098474 A1   Apr. 25, 2013

(51) Int. Cl.
*G05D 11/00* (2006.01)

(52) U.S. Cl.
USPC .................... 137/100; 137/454.6; 137/625.41

(58) Field of Classification Search
USPC ............ 137/98, 100, 315.11, 315.12, 315.14, 137/454.6, 625.41
See application file for complete search history.

(56) References Cited

U.S. PATENT DOCUMENTS

| | | | | |
|---|---|---|---|---|
| 5,983,918 A * | 11/1999 | Chang | ............................. | 137/98 |
| 6,009,893 A * | 1/2000 | Chang | ............................. | 137/98 |
| 6,029,687 A * | 2/2000 | Chang | ............................. | 137/98 |
| 6,302,135 B1 * | 10/2001 | Chung | ............................ | 137/100 |
| 6,412,513 B1 * | 7/2002 | Yang | ............................ | 137/100 |
| 7,806,134 B1 * | 10/2010 | Chang | ............................. | 137/98 |
| 7,918,241 B1 * | 4/2011 | Chang | ............................. | 137/98 |
| 8,267,111 B2 * | 9/2012 | Yang | ............................ | 137/100 |

* cited by examiner

*Primary Examiner* — Craig Schneider
*Assistant Examiner* — R. K. Arundale
(74) *Attorney, Agent, or Firm* — Egbert Law Offices, PLLC (57) ABSTRACT

A cold and hot water balancing valve assembly which can fit common standard specifications. The bottom ends of the cold and hot water through holes of the high legged seat are configured with a water inlet pipe set housing groove for fitting an eccentrically positioned assembled water inlet pipe set, which are made up of cold and hot water tubes. When the meshing edges of the cold and hot water tubes are joined together, a balancing valve housing space is defined inside to hold a cold and hot water balancing valve unit. The cold and hot water balancing valve assembly dramatically reduces the production cost of cold-hot balancing valves while realizing the cold and hot water balancing function.

4 Claims, 10 Drawing Sheets

COLD AND HOT WATER BALANCING VALVE STRUCTURE

CROSS-REFERENCE TO RELATED U.S. APPLICATIONS

Not applicable.

STATEMENT REGARDING FEDERALLY SPONSORED RESEARCH OR DEVELOPMENT

Not applicable.

NAMES OF PARTIES TO A JOINT RESEARCH AGREEMENT

Not applicable.

REFERENCE TO AN APPENDIX SUBMITTED ON COMPACT DISC

Not applicable.

BACKGROUND OF THE INVENTION

1. Field of the Invention

The present invention relates generally to a ceramic valve with cold and hot water balancing functions, and more particularly to a new cold and hot water balancing valve structure which can fit existing standard ceramic valve specifications.

2. Description of Related Art Including Information Disclosed Under 37 CFR 1.97 and 37 CFR 1.98

During use of a traditional cold and hot water balancing valve, the user may easily turn on a water tap by mistake and get hurt by the hot water, and the water temperature is hard to control due to unstable variation of the pressure of the cold and hot water. In view of such problems, some manufacturers have developed a kind of improved ceramic valve which is configured with a cold and hot water balancing valve inside its enclosure.

In the present market, there are plenty of ceramic valve products configured with cold and hot water balancing valves. There are also a number of prior patents related to this. However, there are still some problems and shortcomings to be improved.

The inventor of the present invention has long been engaged in the manufacturing and development of ceramic valve products, and, based on his experience, has discovered that, when a prior-art ceramic valve is configured with a cold and hot water balancing valve, its overall size and specifications, as well as the outer diameter and height of the valve will differ from common standard ceramic valves, and they typically become larger. Such a phenomenon can be easily understood from the following prior patent publications:

A first example is the patent for the utility model of "a water tap control mandrel (1)" (Republic of China Patent Certificate No. M386415). As shown in the drawings of this patent, in proportion, the valve height is larger than general standard ceramic valves. There is another difference: the cold and hot water inlet holes at the bottom of the valve are positioned in the center because the cold and hot water balancing valve is positioned in the center, while in a common standard ceramic valve, the cold and hot water inlet holes at the bottom are positioned on the side.

Other examples are the three patents for utility model of "a cold and hot water balancing valve" (Republic of China Patent Certificate No. M402952, M402953, M402954). As similarly shown in the drawings of these three patents, the cold and hot water inlet holes at the bottom of the valve are also positioned in the center because the cold and hot water balancing valve is positioned in the center. This is different from a common standard ceramic valve, in which the cold and hot water inlet holes at the bottom are positioned on the side.

Examples of the above prior-art structures are provided to demonstrate an opinion: when a ceramic valve differs from common standard ceramic valves in size, specifications, height or outer diameter, or the positions of the cold and hot water inlet holes, it means the specifications of the groove configured on the water tap body to house the ceramic valve, as well as the cold and hot water inlet flow passages need to be changed accordingly. As a result, when a prior-art ceramic valve needs to be fitted with a cold and hot water balancing valve, it will not match with existing standard ceramic valves or water tap products. That is to say, when a manufacturer wants to produce ceramic valve products with cold and hot water balancing valves, it has to make new moulds for manufacturing most of the components of the ceramic valve, and has to manufacture new water taps with new design of the valve tank and cold and hot water inlet flow passage, so as to realize the cold and hot water balancing function of the ceramic valve. So many added or changed manufacturing processes will obviously increase the cost of production and are not industrially economical.

Thus, to overcome the aforementioned problems of the prior art, it would be an advancement if the art to provide an improved structure that can significantly improve the efficacy.

Therefore, the inventor has provided the present invention of practicability after deliberate design and evaluation based on years of experience in the production, development and design of related products.

BRIEF SUMMARY OF THE INVENTION

Figure 8:
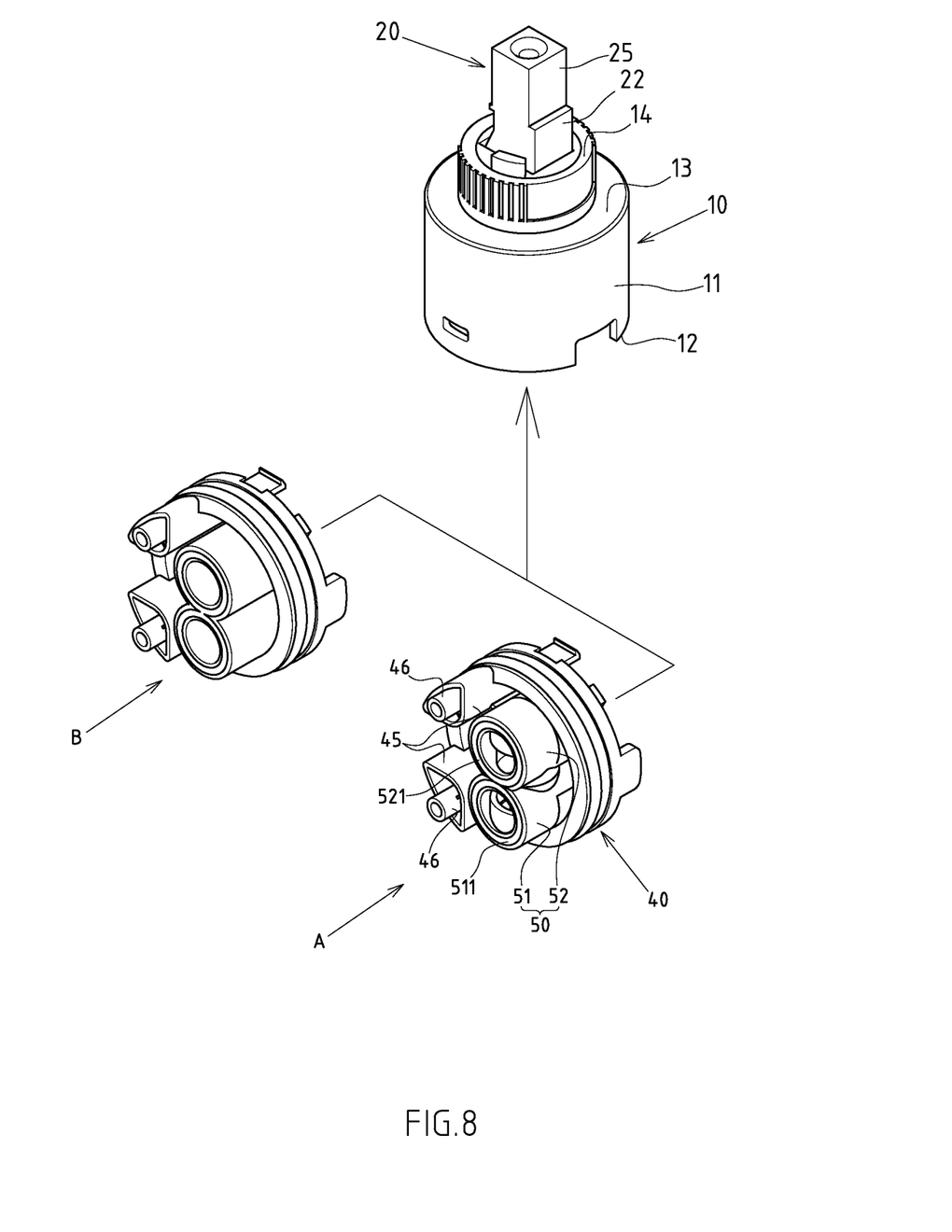
FIG. 8 is a schematic functional view with the specification of the high legged seat of the present invention same as that of the traditional high legged seat and therefore applicable for assembly in the standard valve enclosure.

The facts of efficacy enhancement of the present invention are as follow:

The "cold and hot water balancing valve structure fitting standard specifications" disclosed by the present invention is realized mainly through the following configurations: while maintaining the outer diameter and height of the high legged seat of the valve enclosure under existing standard specifications of ceramic valves, the bottom ends of the cold and hot water through holes of the high legged seat are configured with a water inlet pipe set housing groove for fitting the eccentrically positioned assembled water inlet pipe set, wherein, when the cold and hot water tubes are joined together, a balancing valve housing space is defined inside to hold the cold and hot water balancing valve unit. Through such an innovative and unique structural design, the present invention provides a cold and hot water balancing valve structure fitting existing standard ceramic valve specifications. Referring to FIG. 8, in manufacturing the cold and hot water balancing valve, all components above the seat can use existing components of standard ceramic valves, with no need to make new moulds. Further, the water tap body structure for assembling the cold and hot water balancing valve (including valve tank and cold and hot water flow passages) can also use existing standard specifications and shapes, with no need to change the design. Referring to FIG. 8, Arrow A shows the high legged seat 40 of the present invention, while Arrow B marks the existing high legged seat. As the high legged seat 40 of the present invention is of standard specifications, it can be directly assembled with the standard valve enclosure 10. Therefore, the innovative structural design of the present invention can substantially reduce the production cost of the cold and hot water balancing valves while realizing the cold-hot balancing function. It has practical advancement and good industrial economic effect.

Although the invention has been explained in relation to its preferred embodiment, it is to be understood that many other possible modifications and variations can be made without departing from the spirit and scope of the invention as hereinafter claimed.

DETAILED DESCRIPTION OF THE INVENTION

FIGS. 1 to 4 show a preferred embodiment of the cold and hot water balancing valve of the present invention which can fit common standard specifications. However, such an embodiment is only for the purpose of description, and shall not be limiting to the scope of patent application.

Figure 4:
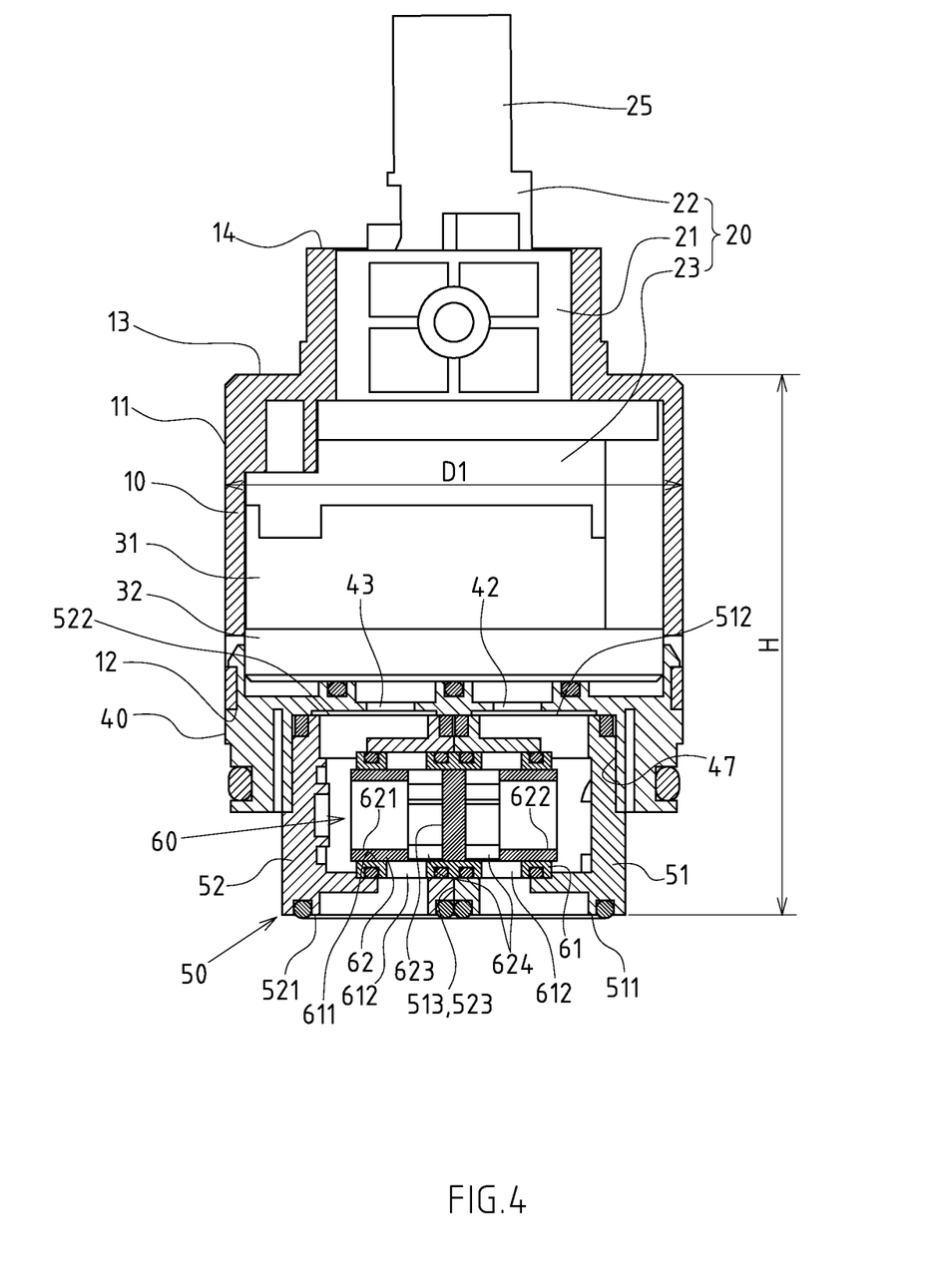
FIG. 4 is an assembled sectional view of a preferred embodiment of the structure of the present invention.

Said cold and hot water balancing valve for common standard specifications includes a standard valve enclosure 10, including a surrounding wall 11, a bottom opening 12, a top surface 13, a reducing orifice 14 configured on the top surface 13, and an inside housing space 15, wherein, the outer diameter of the surrounding wall 11 of the standard valve enclosure 10 must be 40 mm±1 mm or 35 mm±1 mm as typical of standard specifications of common ceramic valve products (marked by D1 in FIG. 4).

A water control mechanism 20 includes a revolving seat 21, a switching rod 22 and a linked board 23. The revolving seat 21 is fitted inside the reducing orifice 14 of the standard valve enclosure 10 in a rotary state, the middle section of the switching rod 22 is hinged into the central through hole on the revolving seat 21 through a cross axle 24, the top end of the switching rod 22 extends beyond the top of the revolving seat 21 and is configured with a water tap connecting part 25, and the bottom end of the switching rod 22 has a poking part 221 inserted into and matching the receiving groove 231 configured on the linked board 23.

A ceramic assembly 30 is held by the inside housing space 15 of the standard valve enclosure 10 and includes a rotary ceramic piece 31 and a fixed ceramic piece 32 positioned up and down and overlapping each other. The fixed ceramic piece 32 is configured with a cold water through hole 321, a hot water through hole 322 and a discharge through hole 323, and the rotary ceramic piece 31 is configured with a collecting tray 311.

A high legged seat 40 is assembled and fitted into the bottom opening 12 of the standard valve enclosure 10, having a top surface 41 for the fixed ceramic piece 32 to contact against, and configured with a cold water vent 42, a hot water vent 43 and an outflow guiding hole 44 in a triangular alternative arrangement, and respectively connected to the cold water through hole 321, hot water through hole 322 and discharge through hole 323 configured on the fixed ceramic piece 32. On one side of the bottom of the high legged seat 40, two spaced projecting legs 45 are configured. The bottom ends of the two projecting legs 45 are both configured with inserting columns 46. The discharge through hole 323 is to be opened between the two projecting legs 45, and the outer diameter of the high legged seat 40 shall meet the standard specification typical of the standard valve enclosure 10. Moreover, a water inlet pipe fitting groove 47 is configured at the bottom ends of the cold water through hole 42 and hot water through hole 43.

Figure 6:
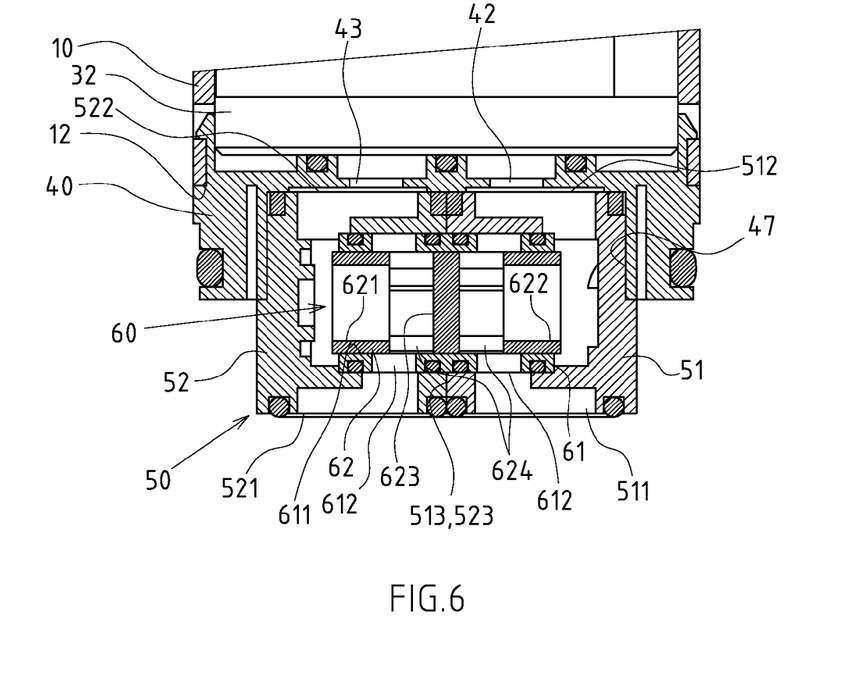
FIG. 6 is a schematic view of the non-working state of the cold-hot balancing component of the present invention.
Figure 7:
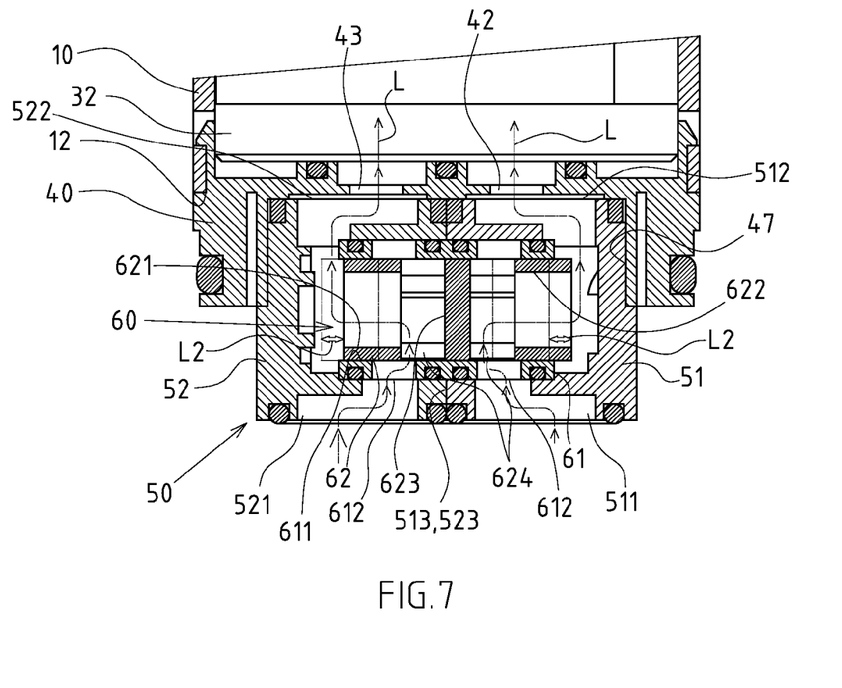
FIG. 7 is a schematic view of the working state of the cold-hot balancing component of the present invention.

An eccentrically positioned assembled water inlet pipe set 50 is fitted in the water inlet pipe set housing groove 47, deviating from the center of the high legged seat 40 (eccentricity marked by W in FIG. 5), made up of a cold water tube 51 and a hot water tube 52. As can be seen in FIGS. 6 and 7, both cold and hot water tubes 51, 52 comprise lower pipe orifices 511, 521, which are correspondingly connected to the upper pipe orifices 512, 522 of the water inlet pipe set housing groove 47, and meshing edges 513, 523 in an opening state, wherein, when the meshing edges 513, 523 of the cold and hot water tubes 51, 52 are joined together, they define a balancing valve housing space 53 inside.

Figure 5:
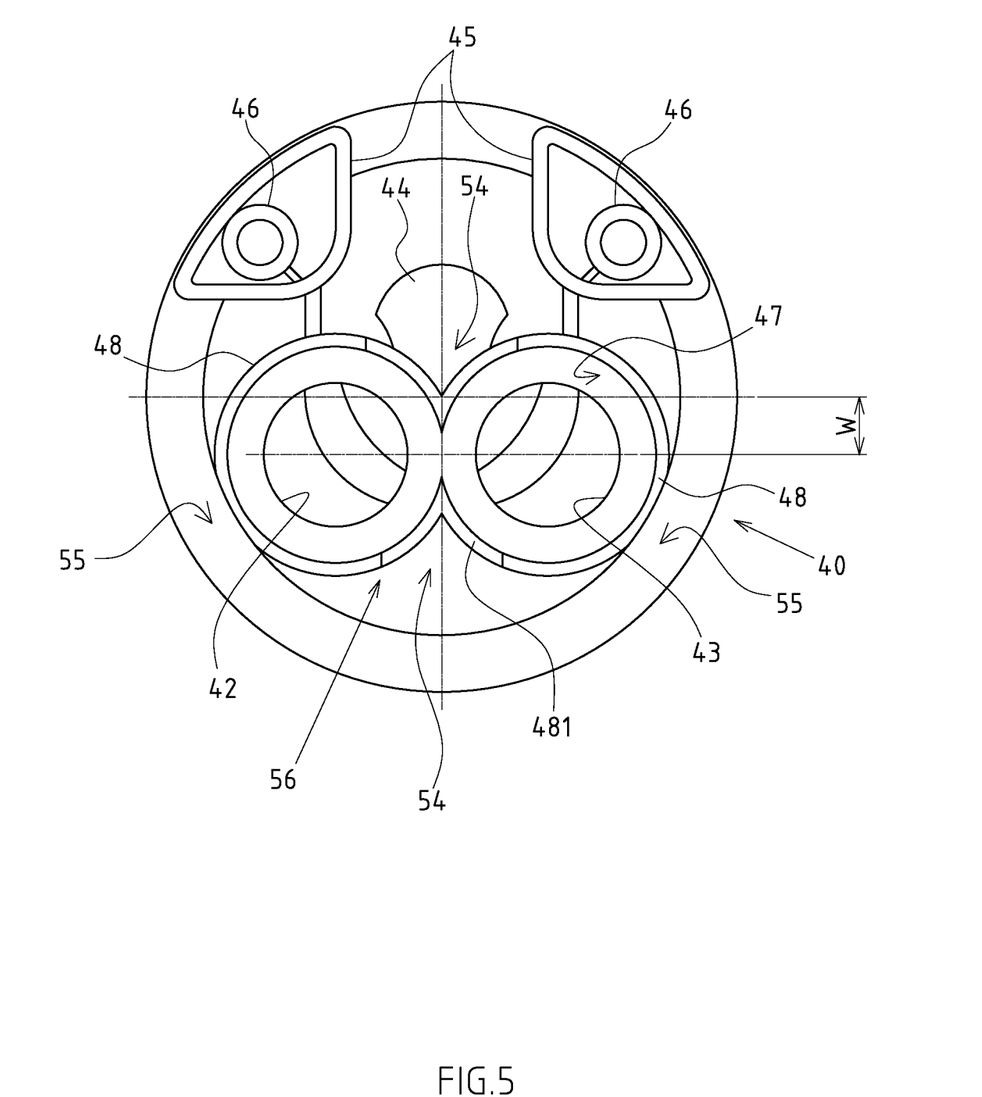
FIG. 5 is a plan bottom view of the high legged seat of the present invention.
Figure 9:
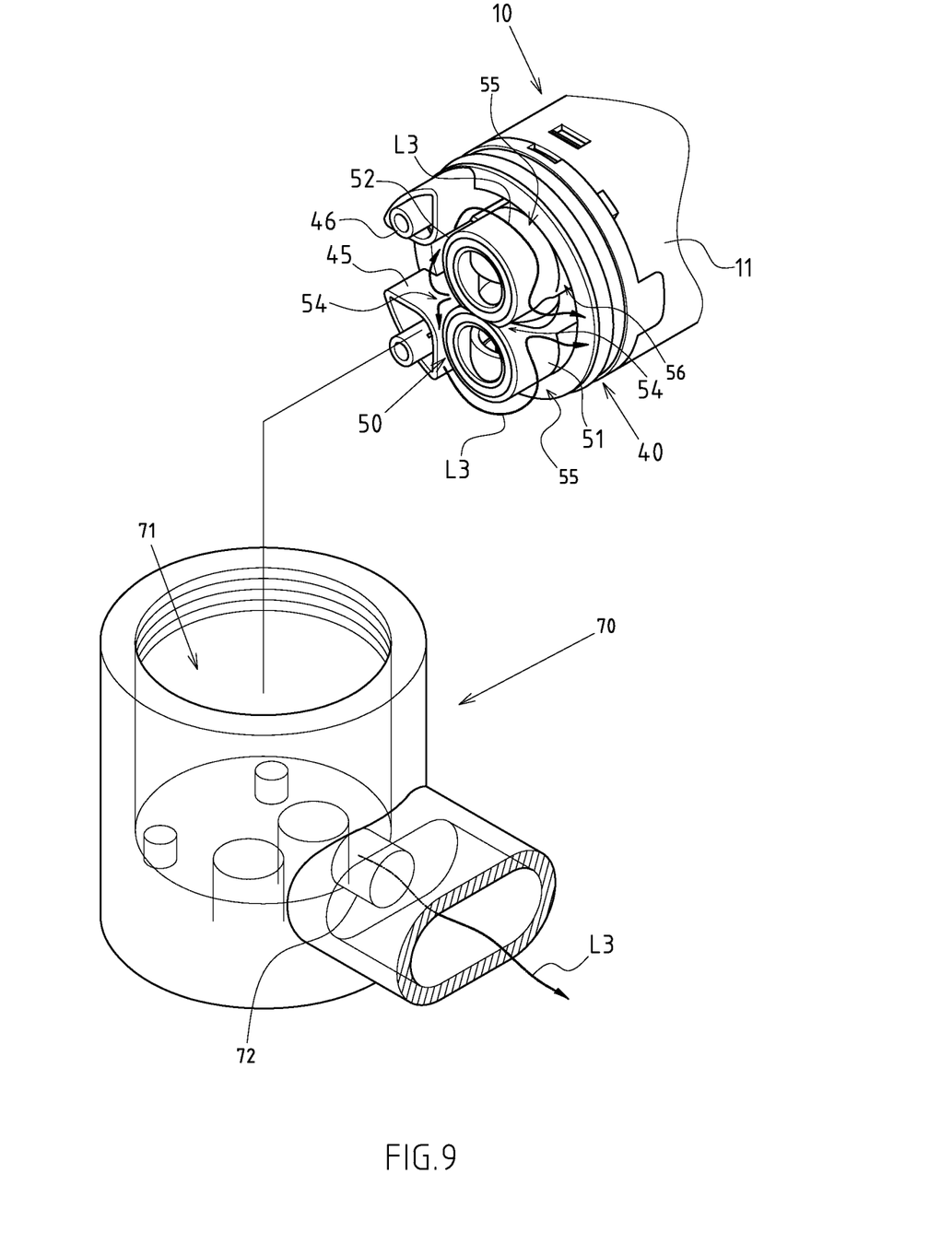
FIG. 9 is a schematic view of the water outward flowing path of the present invention.

A lateral recessing confluence area 54 is defined by the triangular recessed space formed by the intersecting cylinder-shaped walls of the cold and hot water tubes 51, 52 on the same side (as marked in FIGS. 5 and 9).

Two side draining parts 55 are defined by the configuration that the relative outer sides of the cold and hot water tubes 51, 52 are retracted from the high legged seat 40 (as marked in FIGS. 5 and 9).

A cold and hot water balancing valve unit 60 is held inside the balancing valve housing space 53, including a fixed valve tube 61 and a movable valve core 62, wherein, the two ends of the fixed valve tube 61 have through holes 611 to connect with the upper pipe orifices 511, 512 of the cold and hot water tubes 51, 52, and the two ends of the fixed valve tube 61 are respectively configured with exterior mouths 612 to connect with the lower pipe orifices 511, 521 of the cold and hot water tubes 51, 52. An inside recessing groove 621, 622 is configured on each side of the movable valve core 62, and the two inside recessing grooves 621, 622 are separated by a separating board 623, and the two inside recessing grooves 621, 622 are both configured with an interior mouth 624 to connect with the exterior mouth 612 of the fixed valve tube 61.

Further, the height from the lower pipe orifices 511, 521 of the cold and hot water tubes 51, 52 of the assembled water inlet pipe set 50 to the top surface 13 of the standard valve enclosure 10 must be 43 mm±2 mm or 41±2 mm as typical of the standard specifications of ceramic valve products (as marked by H in FIG. 4), wherein, the height of 43 mm±2 mm is to match the standard valve enclosure 10 specification with the outer diameter of the surrounding wall 11 being 40 mm±1 mm, while the height of 41±2 mm is to match the standard valve enclosure 10 specification with the outer diameter of the surrounding wall 11 being 35 mm±1 mm.

Further, the outer diameter of the fixed valve tube 61 is 11 mm±2 mm, and the distance between the exterior mouths 612 configured on the two sides of the fixed valve tube 61 is between 3 mm and 5 mm.

Figure 1:
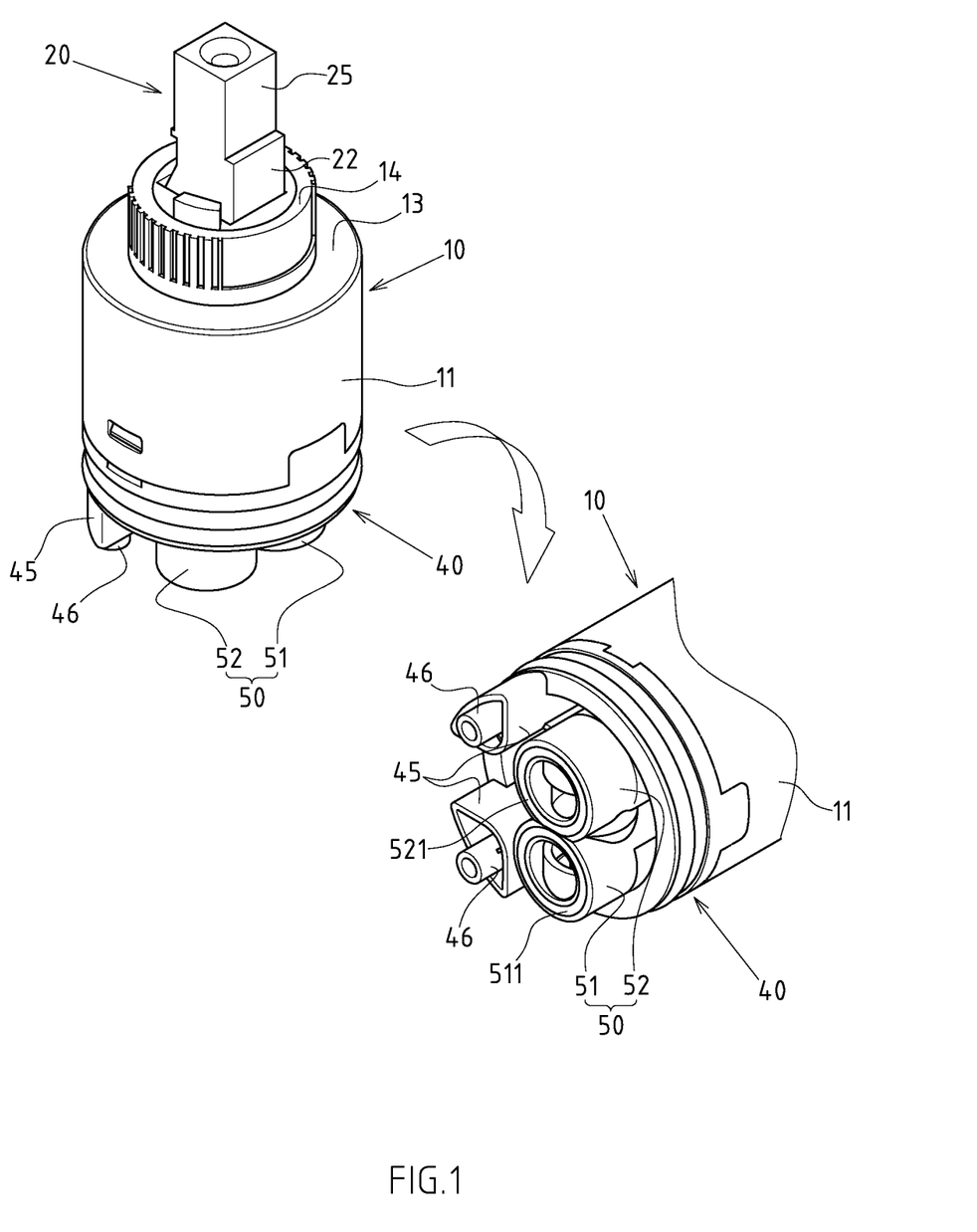
FIG. 1 is an assembled perspective view of a preferred embodiment of the structure of the present invention.
Figure 2:
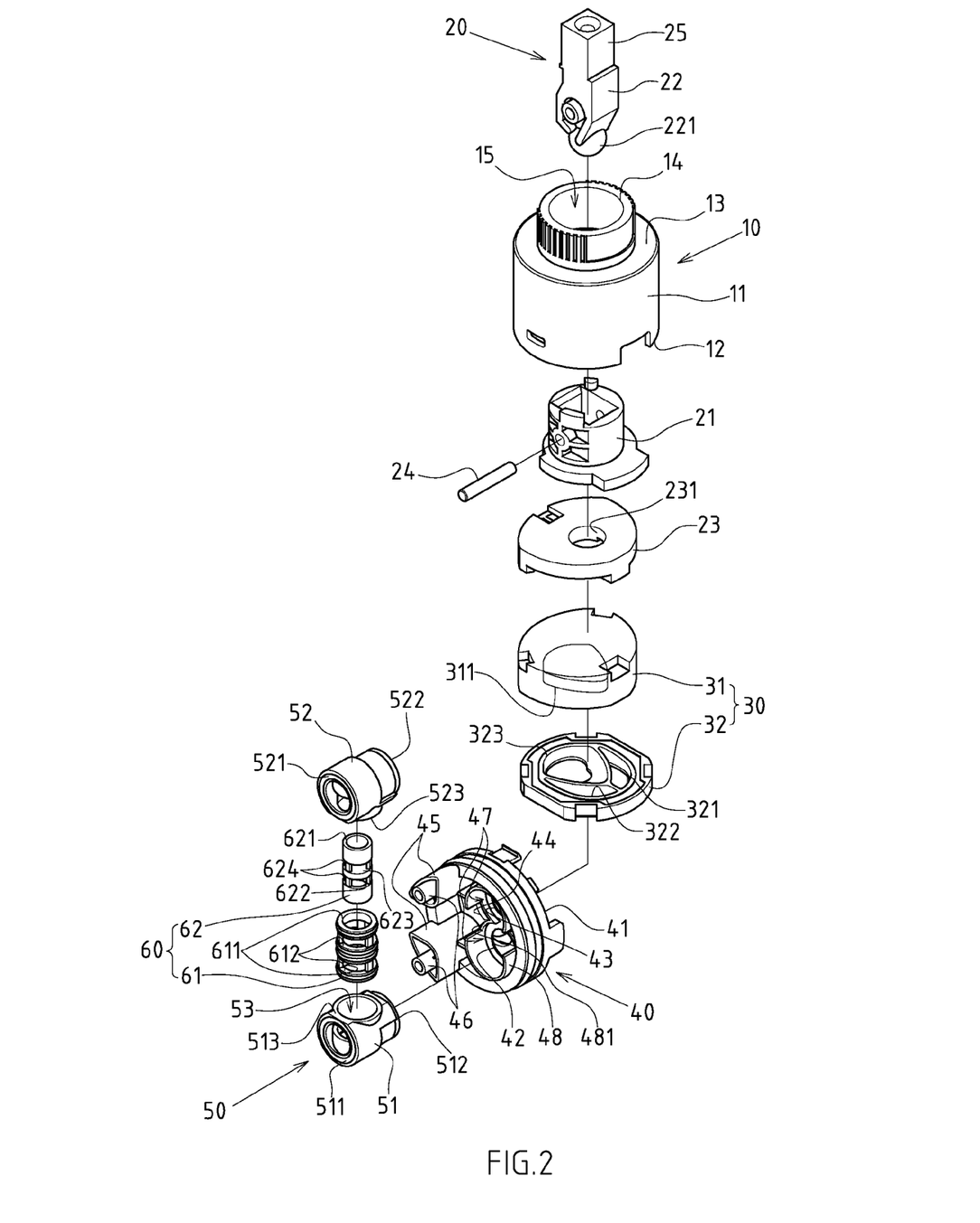
FIG. 2 is an exploded perspective view of a preferred embodiment of the structure of the present invention.
Figure 3:
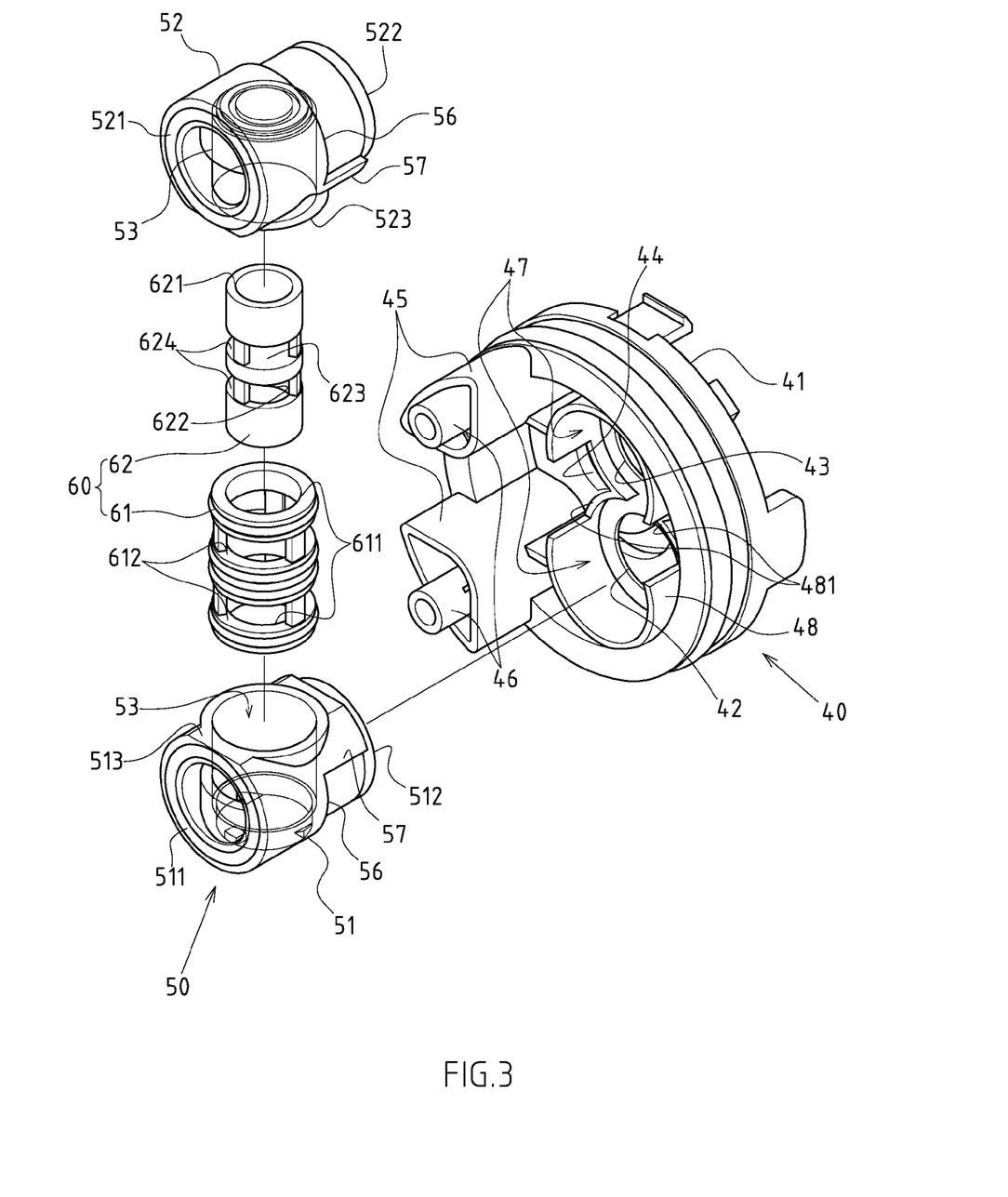
FIG. 3 is an enlarged exploded perspective view of partial components of the present invention.

As detailed in FIG. 3, the water inlet pipe set housing groove 47 configured on the bottom ends of the cold water through hole 42 and hot water through hole 43 configured on the high legged seat 40 can be defined by a projecting ring frame 48, and a partial section of the projecting ring frame 48 is configured with a recessed fitting groove 481. Correspondingly, a shoulder 56 and a fitting flange 57 are configured on the side joining positions of the cold and hot water tubes 51, 52 upper pipe orifices 512, 522 of the assembled water inlet pipe set 50, wherein the shoulder 56 is to contact against the projecting ring frame 48, while the fitting flange 57 is to fit with the recessed fitting groove 481.

The above described structures constitute the design of the present invention. Below is a description of the operating state of the present invention:

FIG. 6 is a schematic view of the movable valve core 62 of the cold and hot water balancing valve unit 60 in a centric balanced state.

Referring to FIG. 7 (and meanwhile referring to FIG. 2), when the water tap with cold and hot water adjusting function is turned on, the switching rod 22 on the water control mechanism 20 can be pushed forward or backward to control the total volume of the cold and hot water flow, and turned left or right to control the temperature of the outlet water.

The cold and hot water balancing function is realized through the following method: firstly, the switching rod 22 is fixed on an angular position between the cold and hot water. At this time, the cold and hot water flows come in respectively from the cold water tube 51 and hot water tube 52 of the assembled water inlet pipe set 50. When the water flow goes into the cold-hot balancing component 60 inside the balancing valve housing space 53 (flow directions of the cold and hot water are marked by L in FIG. 7), based on the pressure difference due to the speed difference or instability of the water flows from the cold and hot water tubes 51, 52 (i.e., high flow speed corresponds to low pressure, low flow speed corresponds to high pressure), the movable valve core 62 of the cold-hot balancing component 60 will float left or right inside the through hole 611 of the fixed valve tube 61 due to the different pressures of the cold and hot water in the inside recessing grooves 621, 622 respectively on the two sides of the separating board 623, and inside the fixed valve tube 61 and movable valve core 62, the size of the exterior mouths 624, 612 will change along with the left or right floating of the movable valve core (as marked by Arrow L2), so that the cold and hot water balancing is automatically controlled, and the water outflow from the water tap will be of stable temperatures, not suddenly hot or cold.

Referring to FIG. 9 (meanwhile referring to FIG. 2), the water outflow (as marked by Arrow L3) after mixing of the cold and hot water from the cold and hot water balancing valve is guided outward through the outflow guiding hole 44 configured on the high legged seat 40, collected into the lateral recessing confluence area 54 through the side draining part 55 on the relative outside of the cold and hot water tubes 51, 52, and then goes outward. As the lateral recessing confluence area 54 is perfectly aligned with the water outlet hole 72 configured on the front side of the valve tank 71 of the water tap 70, the water can be guided outward for water supply.

Figure 10:
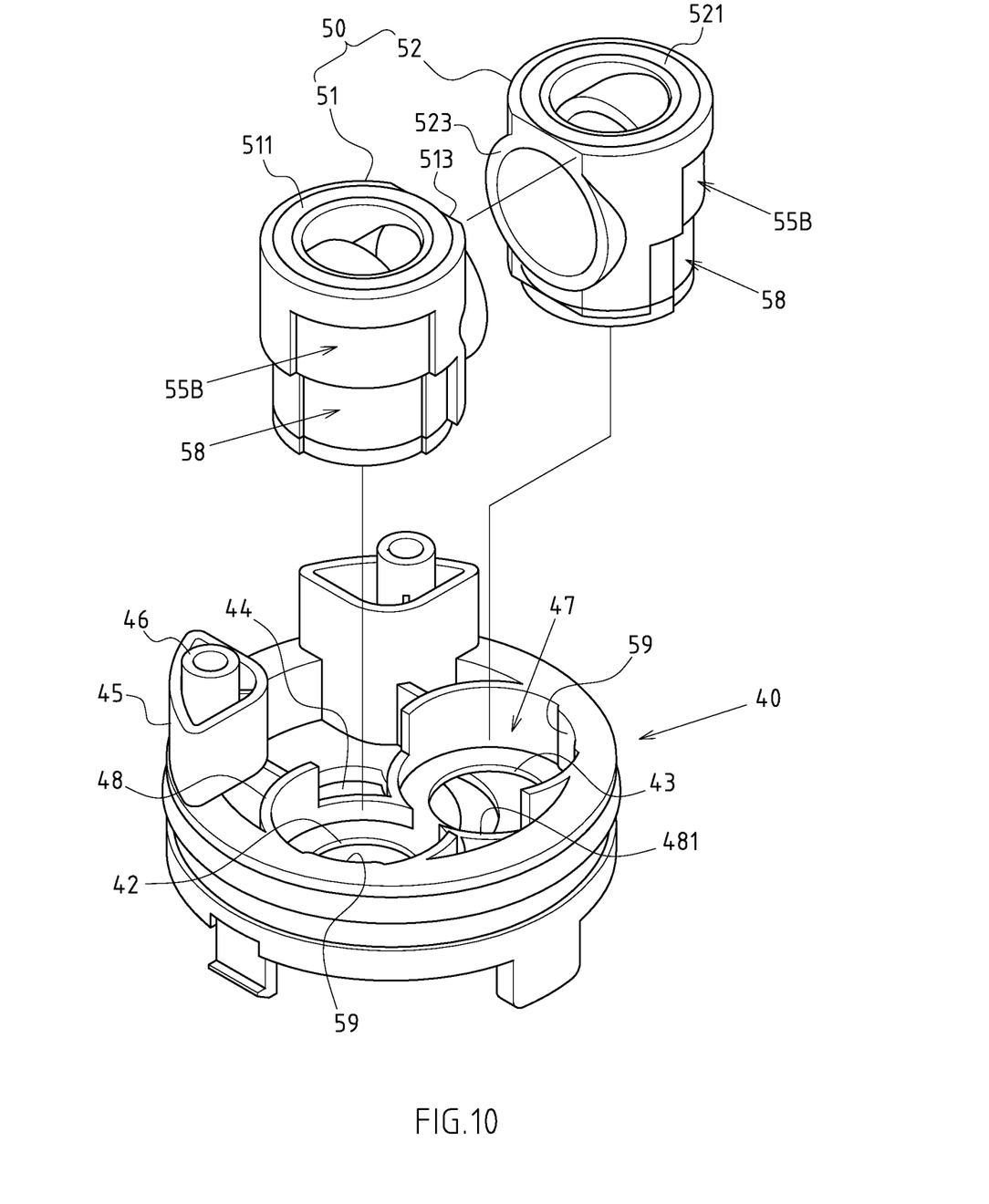
FIG. 10 is a diagram of an implementation example with changed structure of the cold and hot water tube of the present invention to fit smaller standard size of 35 mm.

Referring to FIG. 10, when the outer diameter of the surrounding wall 11 of a standard valve enclosure 10 is of a smaller specification, i.e., 35 mm±1 mm, as this size is too much reduced from the standard specification of 43 mm, while maintaining the size and good flow volume of the cold and hot water balancing valve unit 60, the relative outside of the cold and hot water tubes 51, 52 can be configured with partially recessed surface to form the side draining parts 55B. Further, the relative outside area of the cold and hot water tubes 51, 52 to be fitted into the water inlet pipe set housing groove 47 of the high legged seat 40 can be configured with a recessed edge 58, and correspondingly, the projecting ring frame 48 of the water inlet pipe set housing groove 47 can be configured with a rim 59 to fit the recessed edge 58. Such configurations will solve the problem of limited space of the smaller specification.

Figure 11:
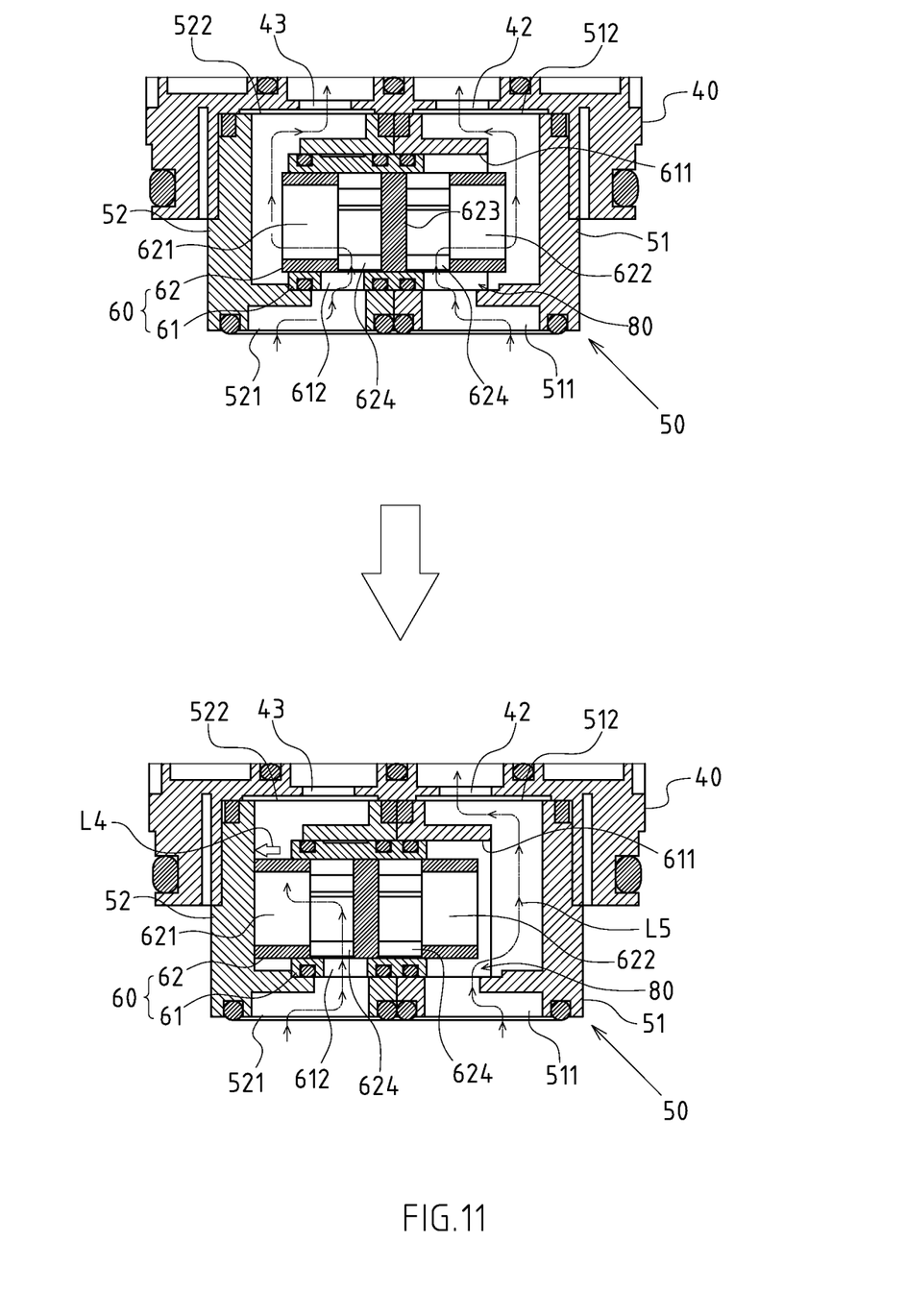
FIG. 11 is a sectional view of the cold and hot water balancing valve unit of the present invention with a non-symmetrical structure and a schematic view of its working state.

Further referring to FIG. 11, the cold and hot water balancing valve unit 60 can also comprise a non-symmetrical structure. Said non-symmetrical structure can be formed by a non-symmetrical design with difference of length of extension from the two ends of the fixed valve tube 61 or movable valve core 62 (note: FIG. 11 is an embodiment of the non-symmetrical design with difference of length of extension from the two ends of the fixed valve tube 61), or by a non-symmetrical design with difference of relative width of the exterior mouth 612 on the two sides of the fixed valve tube 61, or by a non-symmetrical design with difference of relative width of the interior mouth 624 on the two sides of the movable valve core 62. Based on such a design, referring to the lower drawing of FIG. 11, when the cold and hot water balancing valve is shifted to the mode with supply of both cold and hot water, once the hot water pipe passage is blocked and the pressure disappears, the movable valve core 62 will move toward the hot water side of the balancing valve housing space 53 and be resisted against the end wall (as marked by Arrow L4), through configuration of the non-symmetrical structure, a cold water maintaining passage 80 will be formed between the fixed valve tube 61 and movable valve core 62 on the cold water side, so as to maintain supply of cold water (as marked by Arrow L5).

I claim:

1. A cold and hot water balancing valve assembly specifications, comprising:
   a valve enclosure having a surrounding wall, a bottom opening, a top surface, a reducing orifice configured on the top surface, and an inside housing space, wherein an outer diameter of the surrounding wall of the valve enclosure has a diameter of 40 mm±1 mm or 35 mm±1 mm;
   a water control mechanism having a revolving seat, a switching rod and a linked board, wherein the revolving seat is fitted rotatably inside the reducing orifice of the valve enclosure, a middle section of the switching rod is hinged into a central through hole on the revolving seat by a cross axle, a top end of the switching rod extends beyond a top of the revolving seat and is configured with a water tap connecting part, a bottom end of the switching rod has a poking part inserted into and matching a receiving groove formed on the linked board;
   a ceramic assembly received by the inside housing space of the valve enclosure, said ceramic assembly having a rotary ceramic piece and a fixed ceramic piece positioned in overlapping relationship, wherein the fixed ceramic piece has a cold water through hole, a hot water through hole and a discharge through hole, said rotary ceramic piece having a collecting tray;

a high-legged seat assembled and fitted into the bottom opening of the valve enclosure, said high-legged seat having a top surface for the fixed ceramic piece to contact against, said high legged seat having a cold water vent, a hot water vent and an outflow guiding hole in a triangular arrangement, and the cold water vent connected to the cold water through hole, the hot water vent connected to the hot water through hole and the outflow guiding hole connected to the discharge through hole, one side of the bottom of the high-legged seat having two spaced projecting legs, the two projecting legs having respective bottom ends having inserting columns, the discharge through hole opening between the two projecting legs, a water inlet pipe fitting groove is formed at bottom ends of the cold water through hole and hot water through hole;

an eccentrically positioned water inlet pipe set fitted in the water inlet pipe fitting groove, the water inlet pipe set deviating from center of the high-legged seat, said water inlet pipe set having a cold water tube and a hot water tube each having lower pipe orifices which are respectively connected to upper pipe orifices of the water inlet pipe fitting groove, said water inlet pipe set having meshing edges in an opening state, wherein a balancing valve housing space is defined when meshed with meshing edges of the cold and hot water tube;

a lateral recessing confluence area defined by a triangular recessed space formed by intersecting cylinder-shaped walls of the cold and hot water tubes;

two side draining parts defined by relative outer sides of the cold and hot water tubes; and a cold and hot water balancing valve unit positioned inside the balancing valve housing space, said balancing valve unit having a fixed valve tube and a movable valve core wherein two ends of the fixed valve tube have through holes connecting with the upper pipe orifices of the cold and hot water tubes and two ends of the fixed valve tube are respectively configured with exterior mouths to connect with the lower pipe orifices of the cold and hot water tubes, an inside recessing groove is formed on each side of the movable valve core, and the inside recessing grooves are separated by a separating board, the inside recessing grooves each have an interior mouth to connect with the exterior mouth of the fixed valve tube, a height from the lower pipe orifices of the cold and hot water tubes of the assembled water inlet pipe set to the top surface of the valve enclosure is 43 mm±1 mm, wherein the cold and hot water balancing valve unit has a non-symmetrical structure, said non-symmetrical structure is formed by a non-symmetrical design with a difference of length of extension from the two ends of the fixed valve tube or movable valve core, or by a non-symmetrical design with difference of relative width of the exterior mouth on the two sides of the fixed valve tube, or by a non-symmetrical design with difference of relative width of the interior mouth on the two sides of the movable valve core, when the cold and hot water balancing valve is shifted to a mode with a supply of both cold and hot water, once the hot water pipe passage is blocked and the pressure disappears, the movable valve core will move toward the hot water side of the balancing valve housing space and be resisted against the end wall, a cold water maintaining passage is formed between the fixed valve tube and movable valve core on the cold water side so as to maintain supply of cold water.

2. The cold and hot water balancing valve assembly of claim 1, wherein an outer diameter of the fixed valve tube is between 9 mm and 12 mm, and a distance between the exterior mouths configured on the two sides of the fixed valve tube is between 3 mm and 5 mm.

3. The cold and hot water balancing valve assembly of claim 1, wherein the water inlet pipe fitting groove is defined by a projecting ring frame, a partial section of the projecting ring frame has a recessed fitting groove, a shoulder and a fitting flange are formed on the upper pipe orifices of the cold and hot water tubes, wherein the shoulder contacts against the projecting ring frame, the fitting flange is fit in the recessed fitting groove.

4. The cold and hot water balancing valve assembly of claim 1, wherein when the outer diameter of the surrounding wall of the valve enclosure is 35 mm±1 mm, the relative outside of the cold and hot water tubes are configured with a partially recessed surface to form side draining parts, a relative outside area of the cold and hot water tubes has a recessed edge, the water inlet pipe set housing groove has a rim fit into the recessed edge.

* * * * *